United States Patent [19]
Hirayama et al.
[11] 4,297,716
[45] Oct. 27, 1981

[54] RECORDING APPARATUS INCLUDING A CONTINUOUS TRANSFER WEB

[75] Inventors: Kazuhiro Hirayama, Yokohama; Susumu Sugiura, Yamato, both of Japan

[73] Assignee: Canon Kabushiki Kaisha, Tokyo, Japan

[21] Appl. No.: 68,419

[22] Filed: Aug. 21, 1979

Related U.S. Application Data

[63] Continuation of Ser. No. 819,142, Jul. 26, 1977, abandoned.

[30] Foreign Application Priority Data

Jul. 30, 1976 [JP] Japan ..... 51-91836

[51] Int. Cl.[3] ..... G01D 15/06
[52] U.S. Cl. ..... 346/153.1; 346/160
[58] Field of Search ..... 346/153-154, 346/160; 358/300; 101/DIG. 13; 400/194, 582-583.4

[56] References Cited

U.S. PATENT DOCUMENTS

| | | | |
|---|---|---|---|
| 1,547,150 | 7/1925 | Von Pein | 400/194 |
| 1,547,267 | 7/1925 | Shipley | 400/194 |
| 3,198,648 | 8/1965 | Trimbur | 101/DIG. 13 |
| 3,254,626 | 6/1966 | Uemura | 101/DIG. 13 |
| 3,665,486 | 5/1972 | Sato | 346/153 |
| 3,681,527 | 8/1972 | Nishiyama | 346/160 |
| 3,702,482 | 11/1972 | Dolcimascolo | 346/160 |
| 3,757,352 | 9/1973 | Murray | 346/153 |
| 3,829,608 | 8/1974 | Pietermaat | 346/153 |
| 3,856,128 | 12/1974 | Taggart | 400/583 |
| 3,896,451 | 7/1975 | Omi | 346/153 |
| 3,958,224 | 5/1976 | Boyd | 400/583 |
| 3,963,340 | 6/1976 | Gerace | 346/153 |
| 4,048,921 | 9/1977 | Raschke | 346/153 |
| 4,101,018 | 7/1978 | Sokolowski | 400/582 |

FOREIGN PATENT DOCUMENTS 2028868 6/1970 Fed. Rep. of Germany ..... 346/153

OTHER PUBLICATIONS

Xerox Disc Journal, "Transfer Apparatus", by N. Goel, vol. 2, No. 1, Jan./Feb. 1977, p. 59.
IBM/TDB, vol. 19, No. 9, Feb. 1977, p. 3536, "Drum Transport Document", by W. D. Thorne.

*Primary Examiner*—John H. Wolff
*Attorney, Agent, or Firm*—Fitzpatrick, Cella, Harper & Scinto

[57] ABSTRACT

A recording apparatus includes an image bearing member, image forming device for forming images on the image bearing member, a transfer medium, image transferring device for transferring the images from the image bearing member onto the transfer medium, a feeder for feeding the transfer medium to a transfer station, and control system for operatively controlling the transfer device and the feeder with mutually independently set delay times with respect to the start or the stop of operation of the image formation device.

16 Claims, 15 Drawing Figures

RECORDING APPARATUS INCLUDING A CONTINUOUS TRANSFER WEB

This is a continuation of application Ser. No. 819,142, filed July 26, 1977, now abandoned.

BACKGROUND OF THE INVENTION

1. Field of the Invention

This invention relates to a recording apparatus which is particularly effective to print out high quality character or pattern information from an electronic computer or the like.

2. Description of the Prior Art

Heretofore, mechanical impact printers have often been used as the output devices of electronic computers or the like. The recent advancement of electronics has enhanced the processing capability of operation devices or storage devices, and this has in turn given rise to the desire for output printers which will excel over the conventional mechanical impact printers in performance. In answer to these requirements, various non-impact printers have been exploited and among these, the so-called transfer type electrostatic recording or electrophotographic recording system is most excellent because of its high printing speed, high printing quality and low running cost. According to this system, the information from an electronic computer is formed as an electrostatic latent image on an image bearing member such as a photosensitive medium or the like, the electrostatic latent image is developed into a visible image by the use of toner, the visible image is transferred onto plain paper and the toner image on the plain paper is fixed and discharged as an output. No problem occurs as long as the information is continuously supplied, but when information is supplied intermittently or when writing of information is intermittent, blanks corresponding to the intermissions would be created on portions of the transfer paper if the feed of the transfer paper is continuous.

Also, if the feed of the transfer paper is stopped during the intermission of the information to be written and the transfer charger is left operative of paper feed has been stopped, the transfer paper may become stained or the image thereon may be disturbed.

Further, when the fixation of the image on the transfer paper is carried out by heat-fixing means (a heat roller, a radiant heating lamp, a heat plate or the like), the transfer paper may be broken or burnt if it passes intermittently through the fixing means.

Furthermore, if the paper conveyance and the image transfer operation take place intermittently but the rising and the falling time of the paper conveying operation are long, the images may suffer from misregistration and, if the transfer corona or the responsivity of the roller is poor, unsatisfactory image transfer will occur. FIG. 1 of the accompanying drawings shows an example of unsatisfactory image transfer on the transfer paper P1, from which it will be seen that image transfer cannot take place in the trailing end area a of an image and the leading end area b of the next image. The presence of such unrecorded or unclearly recorded areas at the leading and the trailing end of images is particularly inconvenient if the transfer paper is fan-folded paper on which recording should be made in synchronism page by page.

SUMMARY OF THE INVENTION

It is an object of the present invention to provide a recording apparatus for producing recorded images of high quality which are free of unsatisfactory recording effects.

It is another object of the present invention to provide a recording apparatus for forming images at optional locations on a recording medium.

It is still another object of the present invention to provide a recording apparatus for continuously forming good images at optional locations on a recording medium, irrespective of an intermittent information input to be recorded.

It is a further object of the present invention to provide a recording apparatus in which the recording medium may be prevented from being broken or burnt for intermittent feed thereof.

It is a further object of the present invention to provide a recording apparatus which is suitable for recording information on fan-folded paper.

The above objects and other features of the present invention will become fully apparent from the following detailed description taken in conjunction with the accompanying drawings.

DESCRIPTION OF THE PREFERRED EMBODIMENTS

Figure 2:
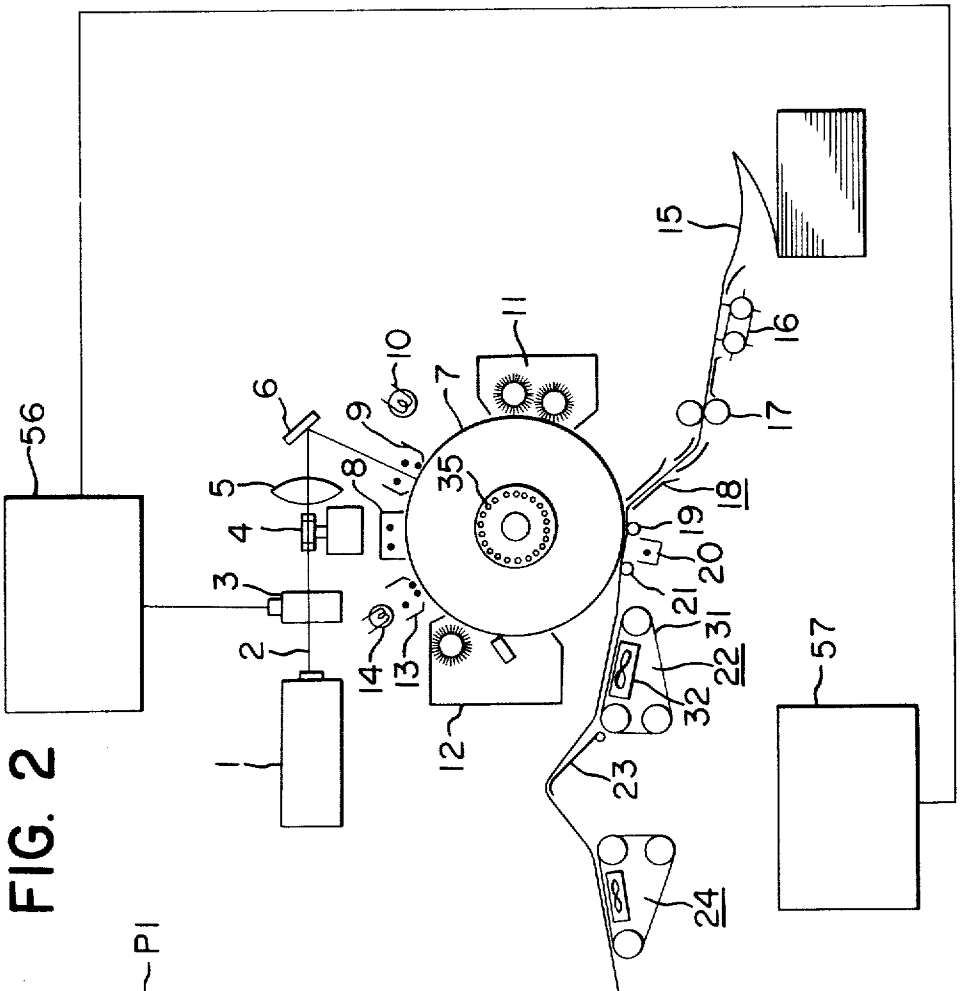
FIG. 2 is a schematic view of an embodiment of the recording apparatus according to the present invention.
Figure 2:
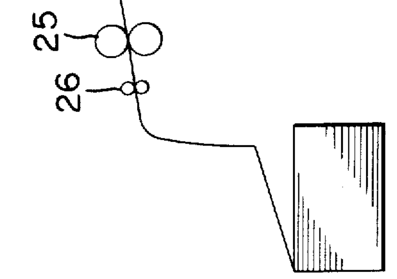

FIG. 2 schematically illustrates an embodiment employing the electrophotographic process. A laser beam 2 oscillated from a laser oscillator 1 is modulated by an input signal from an information output device 56 to a modulator 3, whereafter the laser beam is scanned by a rotating polygonal mirror 4 and focused on a drum-shaped photosensitive medium rotating in the direction of the arrow. To accomplish the exposure of the photosensitive medium to the light image, use may also be made of other means such as cathode ray tube, plasma display or the like.

The present invention permits application thereto of the various electrophotographic processes which have heretofore been proposed, and as an example thereof, the process disclosed in Japanese Patent Publication No. 23910/1967 is taken to describe an embodiment of the present invention.

The photosensitive medium 7, which basically comprises an electrically conductive back-up member, a photoconductive layer and an insulating surface layer, is uniformly precharged by a primary corona charger 8 and then exposed to the light image carried by the laser beam while, at the same time, it is subjected to AC corona discharge by an AC corona discharger 9, and then the whole surface of the photosensitive medium 7 is uniformly exposed to light from a whole surface exposure lamp 10, with a result that an electrostatic latent image corresponding to the aforementioned light image is formed on the surface of the photosensitive medium 7.

This electrostatic latent image is developed into a visible image by the use of a developer in a developing device 11 which is composed chiefly of electrically charged coloring particles (toner). The developed image is transferred to fan-folded paper 15 by the utilization of image transfer rollers 19,21 and the electric field produced by an image transfer corona discharger 20, the fan-folded paper being a transfer medium conveyed by a tractor 16 having sprocket pins engageable with perforations formed in the transfer medium and by a first intermediate conveyor device 22 having a suction fan 32 and a porous belt 31. (The fan-folded paper 15 will hereinafter be referred to as transfer paper or simply as paper.)

When the information recorded on the photosensitive medium 7 becomes exhausted and the last part of the recorded image is transferred to the transfer paper, the image transfer rollers 19 and 21 are released and the corona discharge for image transfer is stopped. As soon as the transfer paper 15 is disengaged from the photosensitive medium 15, the tractor 16 starts reverse rotation. Thus, the transfer paper on the conveyor belt 31 is attracted by the suction fan 32 while a tension for advancing the transfer paper is imparted to the paper, whereby the transfer paper 15 is separated from the surface of the photosensitive medium. Since the backward tension imparted to the transfer paper by the reverse rotation of the tractor 16 is stronger, the transfer paper 15 is brought back by a sufficient amount to prevent any misregistration or any blur during the restart of copying operation, and stopped at that position. Thereafter, when another image recording cycle is effected on the photosensitive medium 7, the image transfer rollers 19 and 21 again urge the transfer paper 15 against the developed image on the photosensitive medium 7 and a voltage is applied to the image transfer corona discharger 20, whereby the newly developed image on the photosensitive medium 7 is transferred to the transfer paper 15 with the leading end of the new image continuous to the trailing end of the previously transferred image on the transfer paper 15, that is, the newly developed image on the photosensitive medium 7 is transferred to the transfer paper 15 as an image which is free of any misregistration in the seam with respect to the previously transferred image or free of any blur.

Figure 3:
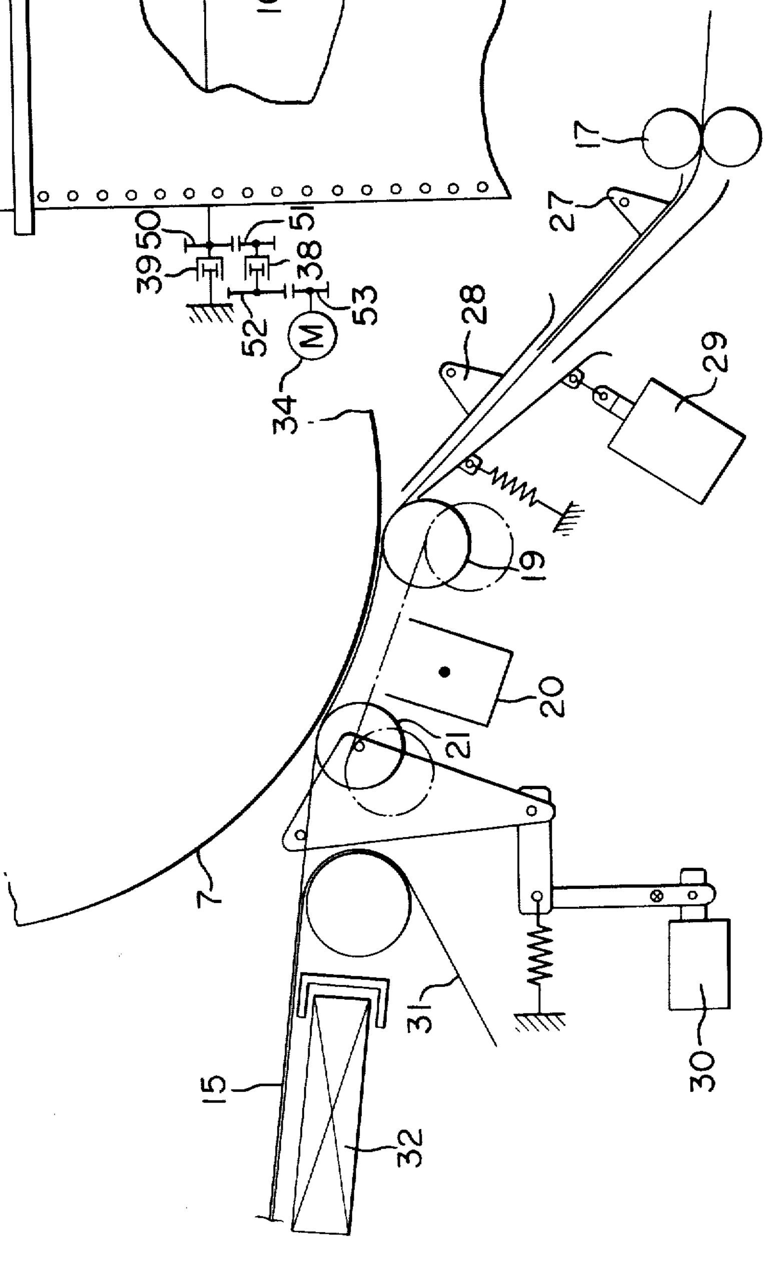
FIG. 3 is a cross-sectional view of the image transfer station seen in FIG. 2.

FIG. 3 is an enlarged view of the image transfer station. The first transfer roller 19 and the second transfer roller 21, both of which have their surfaces covered with insulative rubber, are positioned in proximity to the image transfer charger 20, and these rollers serve to prevent the image from being disturbed by the expanse of the corona charge, namely, prevent scattered toner or blurred image which would be caused if the transfer field of the corona charge is applied before the paper is brought into contact with the photosensitive medium or after the paper is separated from the latter. Moreover, by urging the transfer paper against the photosensitive medium, the transfer rollers 19 and 21 serve to eliminate the floating of the paper which would result in an unsatisfactory image transfer effect, especially, in the case where the transfer paper is fan-folded paper having perforated portions which tend to float with respect to the photosensitive medium to induce an unsatisfactory image transfer effect, and thus serve to ensure that a stable and uniform image transfer is accomplished.

On the other hand, when there is no transfer, the first and second transfer rollers 19 and 21 are retracted to their phantom-line position by a first plunger 29 and a second plunger 30 to release the pressure contact of the transfer paper 15 with the photosensitive medium 7. At the same time, an upper guide plate 28 incorporated in the same base plate, not shown, on which the first transfer roller 19 is mounted, is moved in a direction to separate the transfer paper 15 from the photosensitive medium 7, upon release of the first plunger 29, thereby ensuring the separation of the transfer paper 15 from the photosensitive medium.

Figure 4:
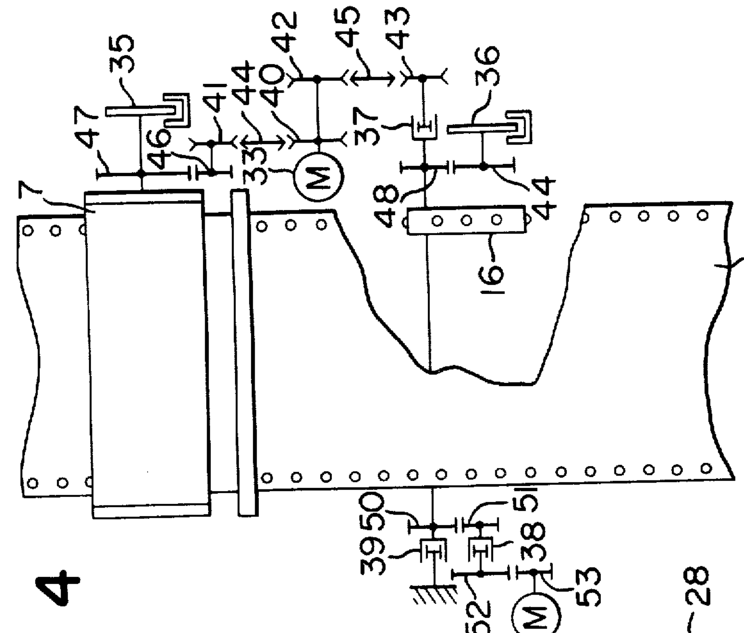
FIG. 4 is a schematic view of the feed drive portion for transfer medium.

FIG. 4 is a schematic for illustrating the mechanism for conveying and returning the transfer paper. In FIG. 4, the photosensitive drum 7 is driven from a drive motor 33 through pulleys 40, 41, timing belt (or chain) 44 and gears 46, 47. The drive motor 33 also cooperates with pulleys 42, 43, timing belt 45, transfer paper conveyance clutch (such as micropowder clutch) 37 and tractor 16 to convey the transfer paper 15. The transfer paper 15 is conveyed in synchronism with the photosensitive drum 7 by the operation of the clutch 37 controlled in accordance with a pulse signal generated by a rotary encoder 35, which will later be described. On the other hand, when the recorded information becomes exhausted, the conveyance clutch 37 is released and a reversing clutch 38 is electrically energized to permit the drive of a paper returning motor 34 to be transmitted through gears 50, 51, 52. 53 to reverse the movement of the tractor 16, thus returning the transfer paper 15. When a predetermined amount of return of the transfer paper 15 is counted by the rotary encoder 36, a stopping clutch 39 is operated to stop the transfer paper 15. When information is again recorded on the photosensitive medium, the conveyance clutch 37 is operated by the signal from the rotary encoder 35 to resume synchronized conveyance of the transfer paper.

In FIG. 4, the conveyance and return of the transfer paper 15 by the tractor 16 has been described with respect to the case that the transfer paper 15 is fan-folded paper, whereas the tractor may be replaced by a pair of rollers and this would especially be effective where the transfer paper is rolled paper or the like.

On the other hand, after completion of the image transfer, any residual coloring particles (toner) on the photosensitive drum are removed by a cleaning device 12, thus rendering the photosensitive drum ready for another electrostatic latent image formation process.

After having passed through the image transfer step, the transfer paper is conveyed to a heat roller type fixing device 25 by a first intermediate conveyor device 22, a buffer device 23 and a second intermediate conveyor device 24. The velocity of the transfer paper before reaching the first intermediate conveyor device 22 is completely synchronized with the movement of the photosensitive medium by the operation of the paper feed tractor 16. On the other hand, the velocity at which the transfer paper passes through the fixing device differs slightly from the paper feed speed of the paper feed tractor 16, because of the diameter of the fixing roller being varied with heat and the meandering movement of the transfer paper being corrected at the second intermediate conveyor device 24. Where the transfer paper is a long footage of continuous paper, such slight errors may be progressively accumulated to cause the transfer paper to be broken or to be stagnant in the course of the conveyor system. These inconveniences may be overcome by detecting any slack in the transfer paper at the buffer device 23 to control the rotational velocity of the fixing roller such that it is increased when the slack is greater than a prescribed value and decreased when the slack is less than the prescribed value. At the fixing device, the transfer roller is conveyed while being subjected to heat and pressure by two rollers. At that time, the transfer paper tends to move slightly obliquely due to such factors as the slight imbalance of the pressure in the direction of the rotational axis, the variation in roller diameter in the rotational direction, imbalance of the lateral expansion of the transfer paper. In the case of a long footage of continuous paper, such slight oblique movement may be accumulated into an substantial amount. At the second intermediate conveyor device 24, accumulation of such oblique movement is prevented by detecting any oblique movement of the transfer paper and varying the suction force of the suction device so as to correct the oblique movement, thereby controlling the lateral balance of the back tension in the transfer paper.

Figure 5:
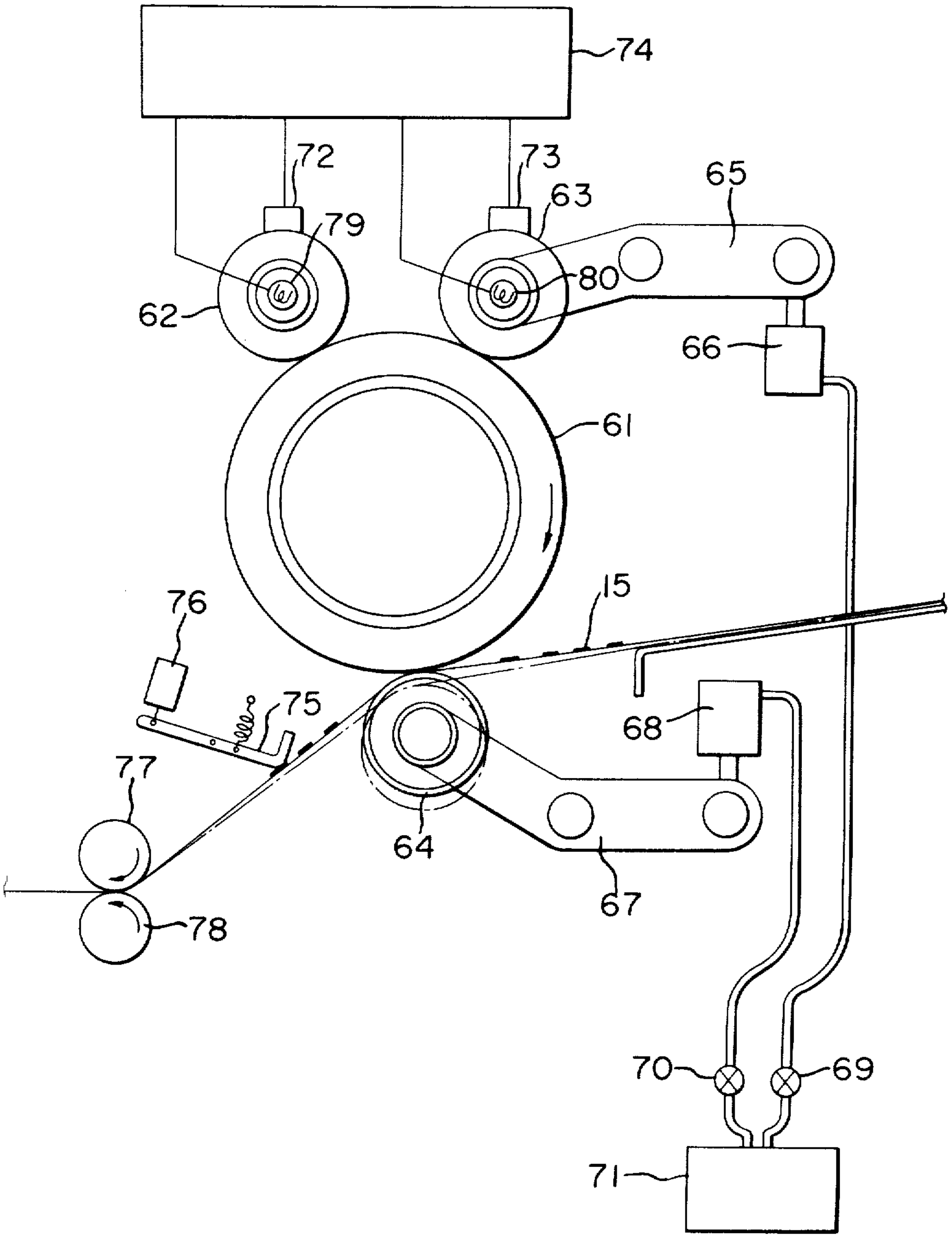
FIG. 5 is a cross-sectional view of the fixing device.

FIG. 5 shows details of the fixing device. The transfer paper 15 bearing toner images transferred thereto is fixed and conveyed while being subjected to heat and pressure by a fixing roller 61 and a pressure roller 64. Paper discharge rollers 77, 78 impart a tension to the transfer paper by a normally constant torque. Heating rollers 62, 63 are rotated in contact with the fixing roller 61, thus imparting heat to the latter. The rotative drive is imparted only to the fixing roller 61 by a drive motor, not shown. The heating rollers 62, 63 and the pressure roller 64 follow the fixing roller. The fixing roller 61 may be formed by adhesively attaching heat-resistant, thick, parting rubber (such as silicone rubber vulcanizable at room temperatures) to the surface of a metallic cylinder. The pressure roller 64 may be formed by adhesively attaching a heat-resistant, thin, elastomeric material to the surface of a metallic cylinder. The heating rollers 62, 63 each comprise an aluminum cylinder having its surface plated with chromium and include infrared ray lamps 79 and 80 disposed therewithin. In the waiting position wherein the transfer paper 15 is not in motion, the pressure roller 64 is spaced apart from the fixing roller 61 and the transfer paper is also spaced apart from the fixing roller 61. The auxiliary heating roller 63 is also spaced apart from the fixing roller 61. The heating roller 62 uniformly imparts heat to the surface of the fixing roller 61 while keeping contact and rotating with the latter. The surface temperature of the heating roller 62 is detected by a thermistor 72 and the electrical energy applied to the heater 79 is controlled to make the surface temperature constant, so that the surface temperature of the fixing roller 61 is maintained constant. Likewise, the surface temperature of the auxiliary heating roller 63 which is then not in contact with the fixing roller 61 is also maintained at a predetermined level. These temperature controls are effected by a temperature control circuit 74 in a well-known manner.

The fixing operation is started in the manner which will hereinafter be described. First, rotation of the fixing roller 61 is stopped, and then the pressure roller 64 is urged against the fixing roller 61 by the operation of an air cylinder 68 through an arm 69. Thus, the transfer paper 15 is also urged against the fixing roller. When the pressing operation becomes completed, the fixing roller starts rotating. At the same time, the auxiliary heating roller 63 is urged against the fixing roller 61 by the action of an air cylinder 66 through an arm 65. This performs the function of supplying heat to the surface of the fixing roller 61 and maintaining the surface temperature constant, the supplied heat being carried away by the transfer paper 15 during the fixation.

The fixing operation is terminated in the following sequence. After the rotation of the fixing roller 61 has been stopped, the auxiliary heating roller 63 is brought out of contact with the surface of the fixing roller 61 by the operation of the air cylinder 66 and the pressure roller 64 is brought out of contact with the fixing roller 61 by the air cylinder 68. At the same time, a separating piece 75 is operated by a solenoid 76 to beat down the transfer paper 15 from the surface of the fixing roller 61. The transfer paper comes to a position indicated by a dot-and-dash line, due to the back tension imparted from the second intermediate conveyor means and the tension imparted from the discharge rollers 77 and 78. When the transfer paper is separated from the fixing roller surface, the fixing roller 61 resumes rotation. Thus, the waiting position is restored.

Figure 6B:
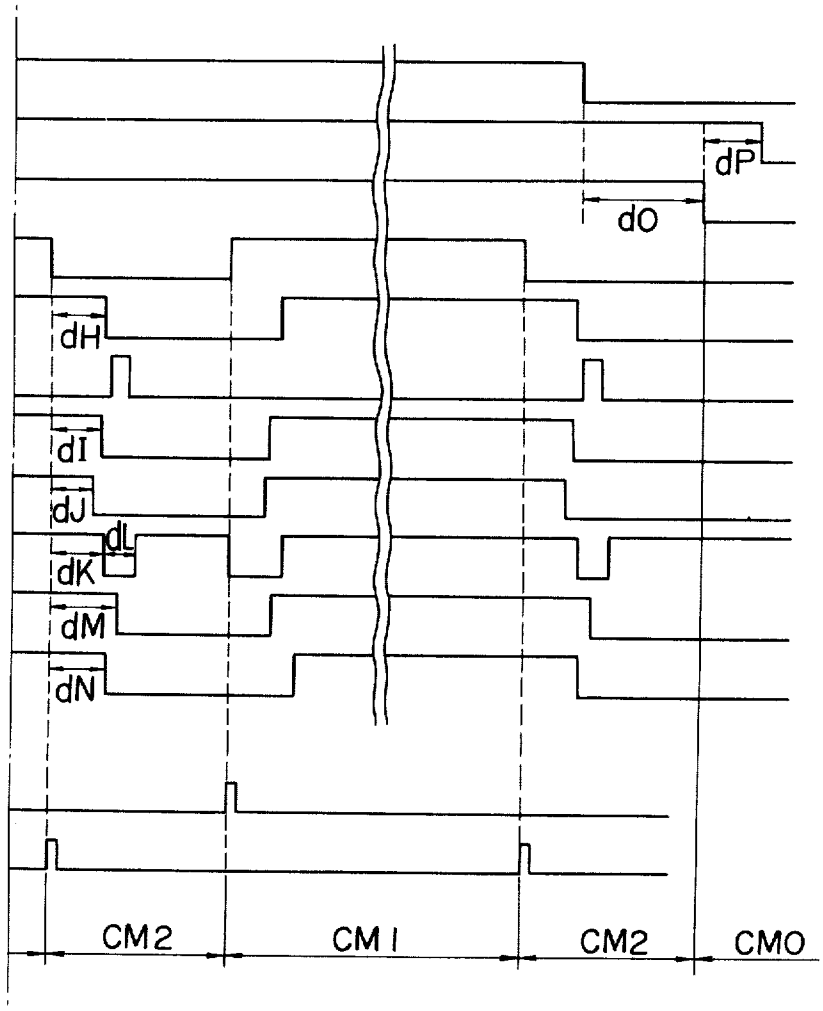
FIGS. 6A and B is a time chart of the recording apparatus according to the present invention.
Figure 6:
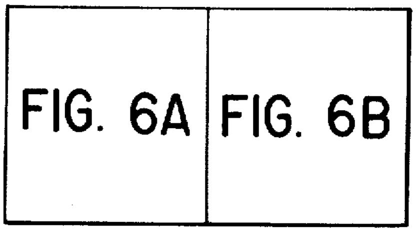
Figure 6A:
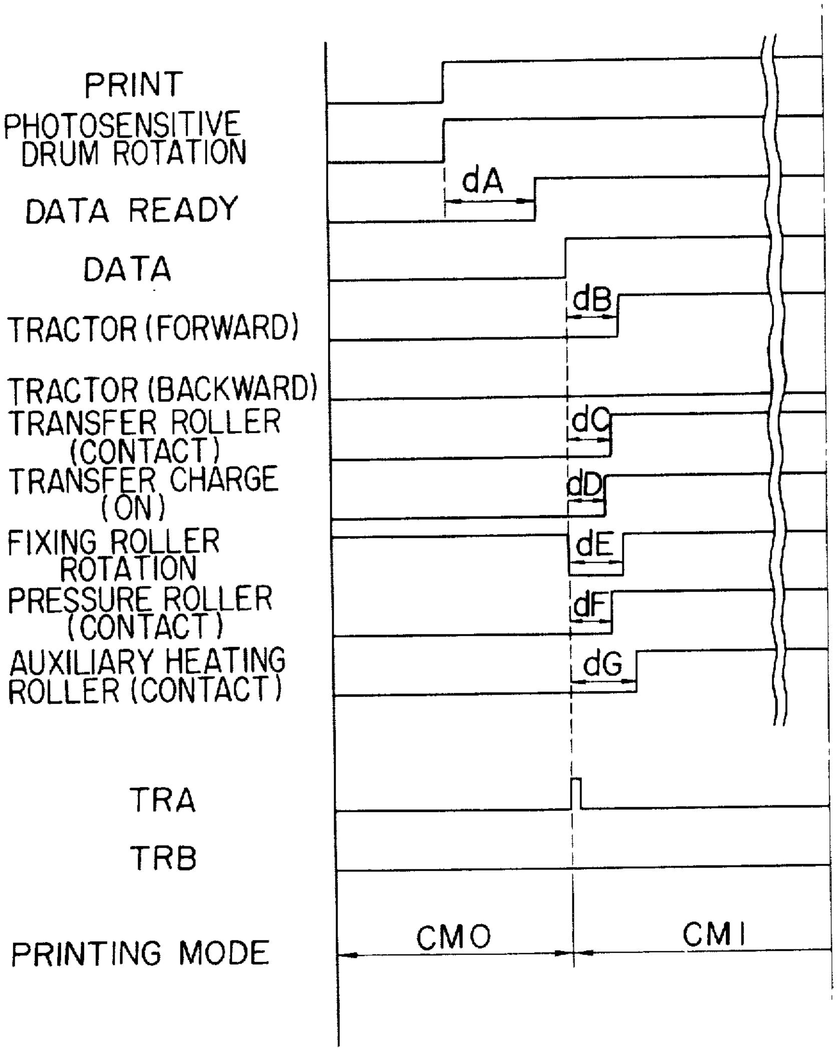

The operational timing between the fixing roller 61 and the auxiliary heating roller 63 and the pressure roller 64 is illustrated in FIG. 6. By the above-described sequence of operation, when the transfer paper is intermittently moved, perfect fixation is performed without inducing any of such inconveniences as unfixed image portions, image registration, burnt transfer paper, etc. It will be noted that air is introduced from a compressor 71 into the air cylinders 66 and 68 through electromagnetic valves 69 and 70. Control of the operation of the air cylinders 66 and 68 is performed by changing over the electromagnetic valves 69 and 70 between a position for introducing the air into the respective air cylinders and a position for letting out the air in the air cylinders.

Figure 11:
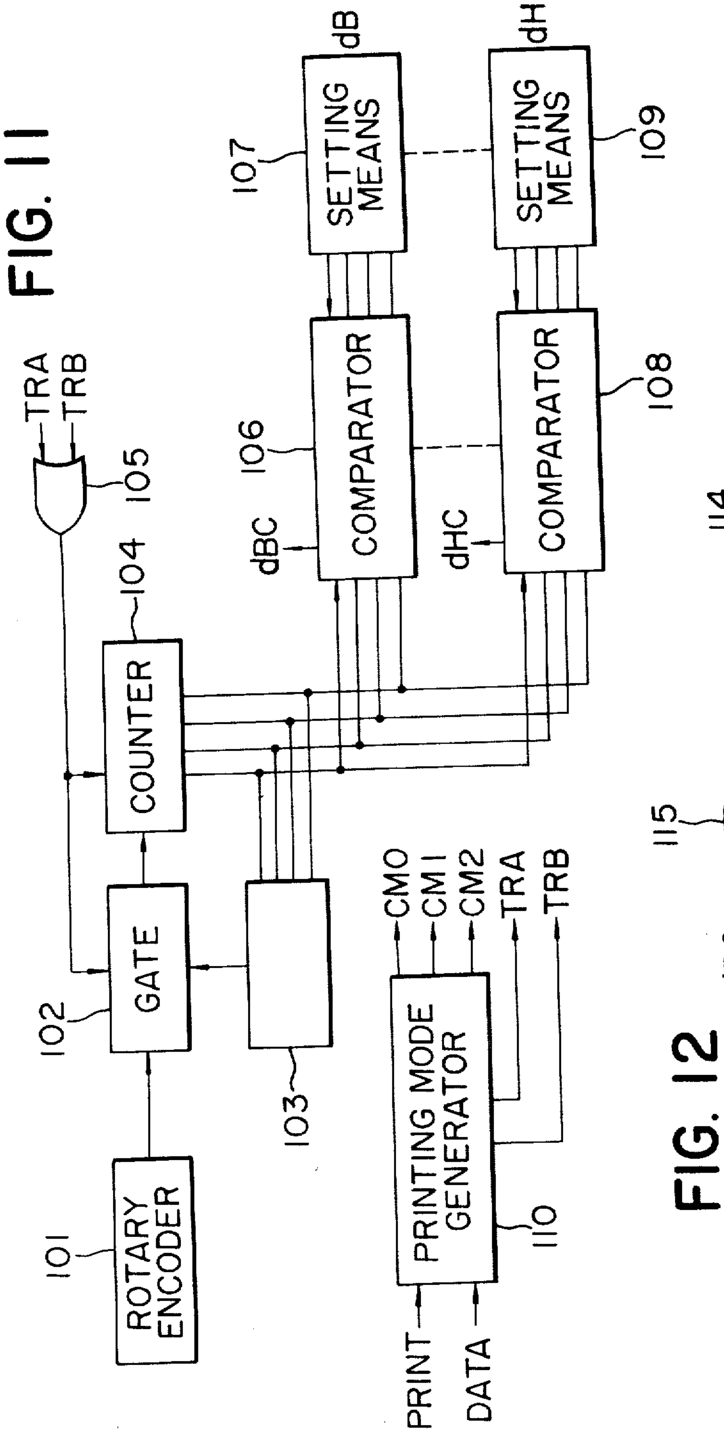
FIGS. 11, 12, 13 and 14 diagrammatically show the circuits for forming control signals.

The above-described sequence of latent image formation, transfer and fixation and the timing control of the driving portion necessary therefor is effected by a control circuit 57 (FIG. 11).

Figure 1:
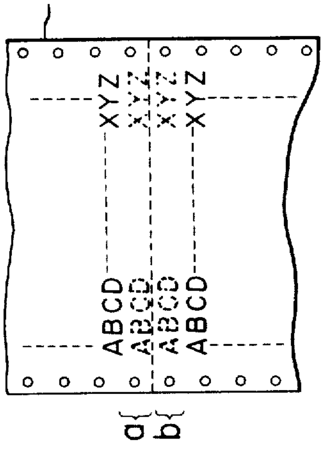
FIG. 1 is a plan view of a recording medium showing the recorded condition according to the prior art.

FIG. 6 is a timing chart for illustrating the relations in operation between main print signals and the driving portion. First, the main switch of the apparatus is closed to make and complete such preparations as preheating of the fixing device, placement of the transfer paper at a predetermined position, etc. Here, the information output device 56 of FIG. 1 is that of a computer and when information to be recorded is prepared, this device sends PRINT signal to the control circuit 57 on the recording apparatus side. By the PRINT signal, the control circuit 57 electrically energizes the motor for rotatively driving the photosensitive drum. At the same time, all the chargers except the transfer charger 20, the developing device, the cleaning device and the lamps start operating to make preparations for latent image formation (pre-rotation).

When the pre-rotation is completed (dA), DATA READY signal is sent back from the control circuit 57 to the information output device 56. If the DATA READY signal is "1", the information output device 56 starts transferring the data. During the transfer of data, DATA signal is "1" and at the same time, necessary modulating signal is sent to the modulator 3.

Figure 7:
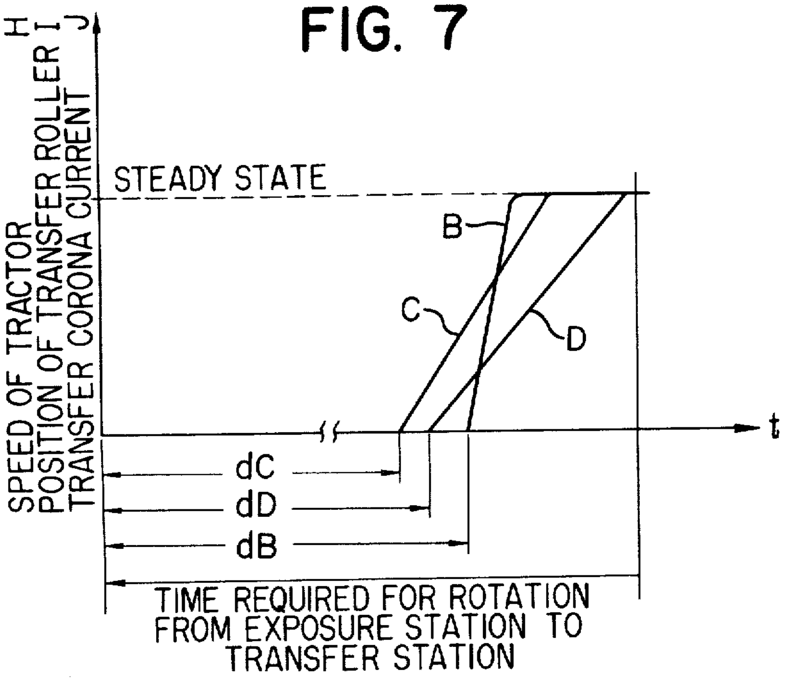
FIGS. 7 and 8 illustrate the characteristics of the image transfer elements at the start and end of image transfer.

Simultaneously with the rising of the DATA signal, the head of the information to be recorded is projected upon the photosensitive drum 7 at the exposure station of FIG. 1 (the station whereat the AC charger 7 is located). This head is made into an electrostatic latent image with high contrast by whole surface exposure and developed into a visible image and when it reaches the image transfer station, the transfer paper comes into contact with the photosensitive medium and starts moving at the same velocity as the peripheral velocity of the photosensitive drum while, at the same time, a voltage is applied to the transfer charger. If the rising of the movement of the transfer paper, the rising of the movement of the transfer roller to its contact position and the rising of generation of the transfer corona are within a sufficiently short time, the following relation may suffice: dB=dC=dD=T (T is the time required for the photosensitive drum 7 to rotate from the exposure station to the transfer station). However, considering the actual values of these rising times (of the order of several milliseconds to 100 milliseconds), dB, dC and dD are determined with these rising times taken into account in order to provide perfect image transfer. These relations will now be described by reference to FIG. 7. For image transfer to be completely performed, it is necessary during image transfer, as already described, that the velocity of the photosensitive drum and the velocity of the transfer paper be equal to each other, that contact be maintained between the transfer paper and the photosensitive drum and that the intensity of the transfer corona be sufficient, and to prevent scattering of the toner image, the transfer corona should not be imparted before the transfer paper comes into contact with the photosensitive drum. To satisfy these conditions, the velocity of the transfer paper (i.e. of the tractor) should first be made constant, and then the transfer paper should be brought into contact with the photosensitive drum, whereafter transfer corona should be imparted.

Due to such series of operations, there may occur on the transfer paper blank portions having no transferred image or portions having unsatisfactorily transferred images. To reduce these portions, dB, dC and dD are determined as shown in FIG. 6. In this manner, the blank portions or the unsatisfactorily transferred image portions may be reduced by taking into account the rising times of the transfer paper feed means, transfer paper urge means and transfer field imparting means and providing optimal timings for energizing these means.

Figure 8:
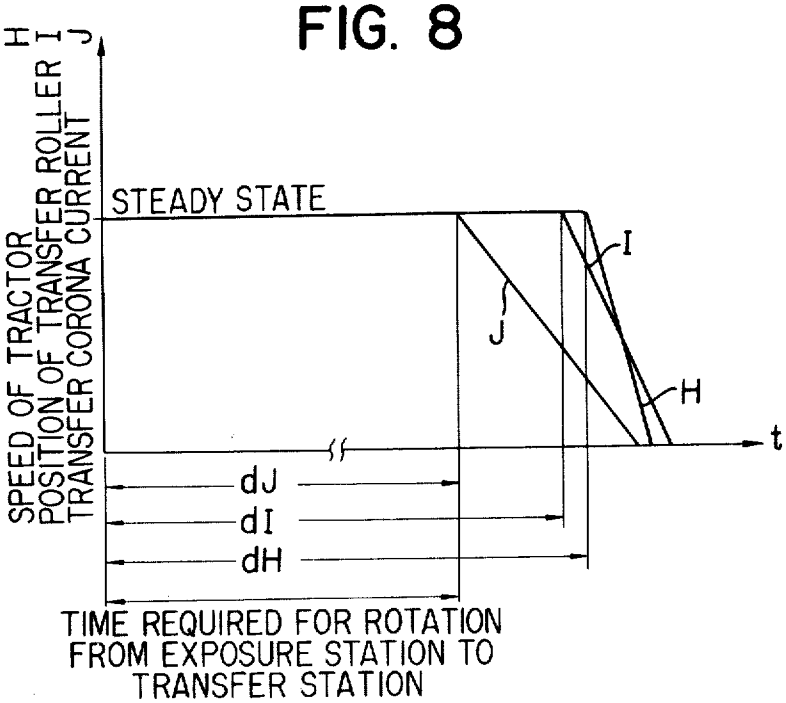

Likewise, at the end of image transfer, the timings dH, dI and dJ for deenergization are determined with the falling times of said various means (FIG. 8). Where the rising and the falling times of the tractor, the transfer roller and the transfer corona were 7-10 milliseconds, 30-40 milliseconds and 80-100 milliseconds, respectively, the blank portions formed on the transfer paper at the beginning and the end of the transfer under the condition that the peripheral velocity of the photosensitive drum is 2000 inches per minute could be reduced to ½ inch or less.

Also, to further reduce or null the blank portions, the transfer paper may be moved back at the end of transfer by an amount corresponding to the blank portion.

Figure 9:
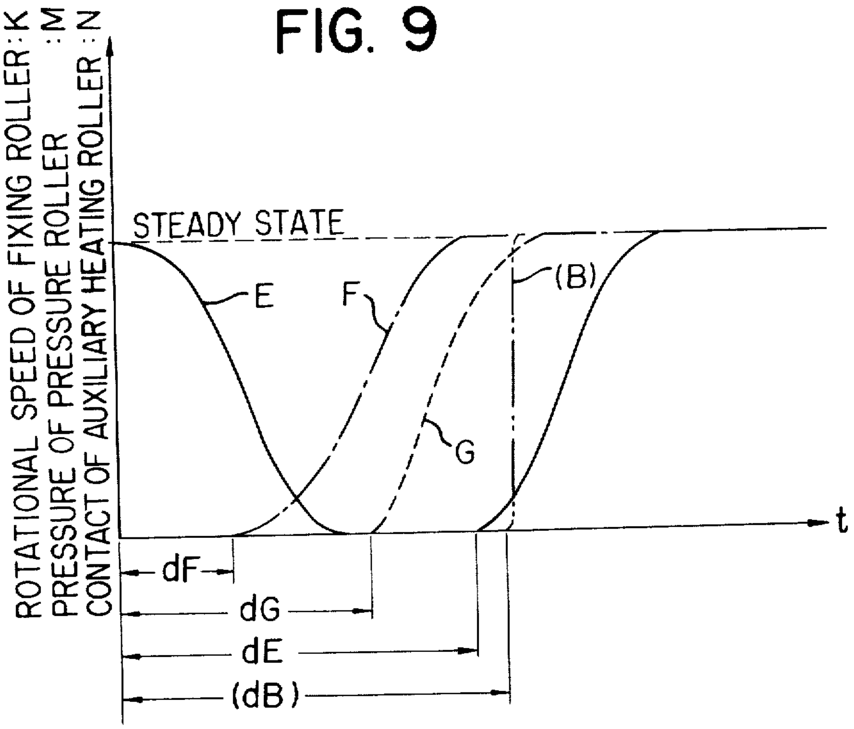
FIGS. 9 and 10 illustrate the characteristics of the fixing elements at the start and end of image transfer.
Figure 10:
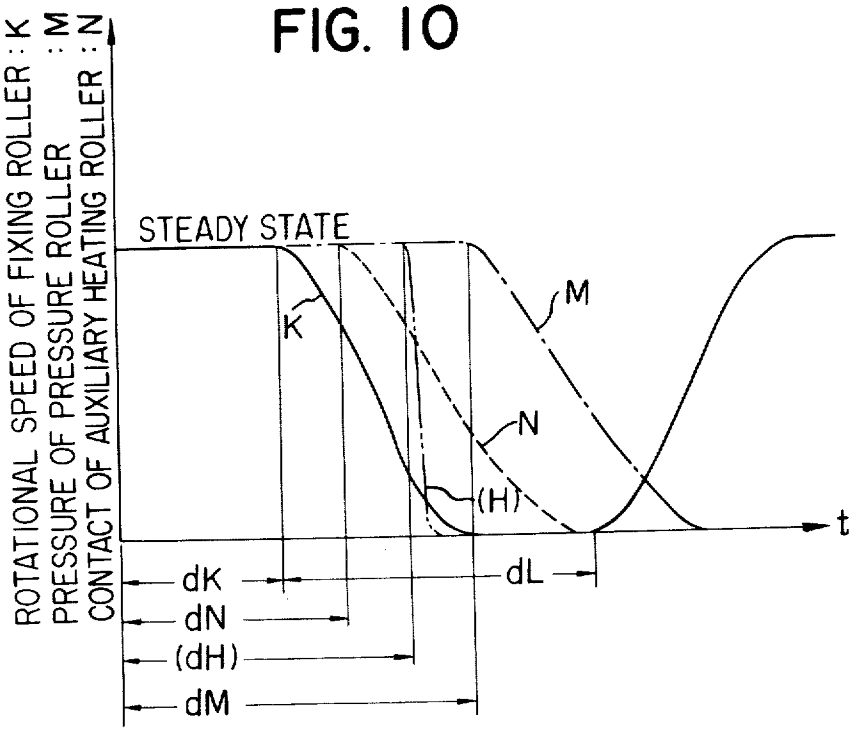

Also, in the fixing device, when the transfer paper is intermittently fed, the above-described sequence of operation takes place to completely perform fixation, but unless the rising and the falling times of the start and stop of rotation of the fixing roller and of the pressure application and release of the pressure roller are taken into account, the difference between the amount of the transfer paper fed by the tractor and the amount of the transfer paper conveyed by the fixing device will exceed the tolerance which can be absorbed by the buffer device 23, so that the transfer paper may be broken. Preferred movements of the various elements in the fixing device at the start of image transfer are illustrated in FIG. 9, and those at the end of image transfer are illustrated in FIG. 10.

The developing device is also controllable to effect intermittent operation.

In this manner, the series of recording operation is completed and the PRINT signal from the information output device becomes "0". However, the control circuit maintains a print-ready condition for some time ($\overline{dO}$) and keeps DATA READY signal at "1". If PRINT signal again becomes "1" during this period, the information can be immediately written without requiring the pre-rotation time (dA). Even if the period dO is exceeded but unless PRINT signal becomes "1", the sequence for stopping the photosensitive drum takes place (dP), whereafter the photosensitive drum stops rotating, thus restoring its initial waiting position.

The dB, dC, dD, dE, dF and dG shown in FIG. 6 may be provided with high accuracy by counting, with the rising of DATA signal from "0" to "1" as the reference, a predetermined number of pulses from the rotary encoder 35 which generates a pulse number proportional to the amount of rotation of the photosensitive drum connected to its rotary shaft. Likewise, dH, dI, dJ, dK, dM and dN may also be provided by counting a predetermined number of pulses from the rotary encoder 35 with the falling of DATA signal from "1" to "0" as the reference.

Figure 12:
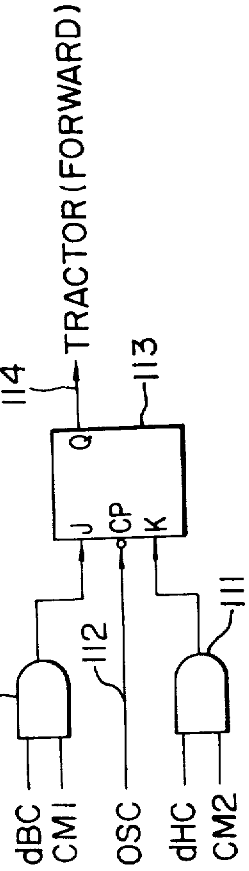

FIG. 11 shows an embodiment of the counting circuit for these pulses and FIG. 12 shows an embodiment of the circuit for generating driving signals for said various means.

The rotary encoder 35 generates a series of pulses by photoelectrically detecting a number of pores formed in a porous disc provided on the rotary shaft of the photosensitive drum.

Through a rotary encoder 101 and by the rotation of the photosensitive drum, pulses are repetitively generated and applied to a gate circuit 102. From the gate 102, the pulse is further applied to and counted by a counter 104. The photosensitive medium, which is in an endless form, never effects gating depending on the drum position. Designated by 105 is an OR circuit for resetting the counter 104 by signals TRA and TRB and opening the gate 102. Coincidence between setting means 107 and 109 for setting the count number and the driver timing is discriminated by comparators 106 and 108. When the coincidence is found, there are generated coincidence pulses, for example, dBC and dHC.

Designated by 103 is a circuit which serves to discharge the pulse to the gate 102 to close it when a maximum count number is reached. The purpose of the circuit 103 is to prevent the possibility that if the counter is of the two-digit count type, the coincidence pulse may appear again and again during the same mode because the drum pulse reaches 99 and then returns to 0, whereupon counting is started again. Designated by 110 is a print mode generating circuit for generating print mode signals CM0, CM1, CM2, data rising signal TRA and data falling signal TRB, as shown in FIG. 6, in response to "PRINT" and "DATA" signals sent from the information output device 56. If the time required from the rising of DATA READY signal till the DATA signal is sent is substantially equal, this circuit may also be represented by FIG. 13. FIG. 14 shows an example of the ON-delay OFF-dalay pulse generator 120 in FIG. 13.

Figure 13:
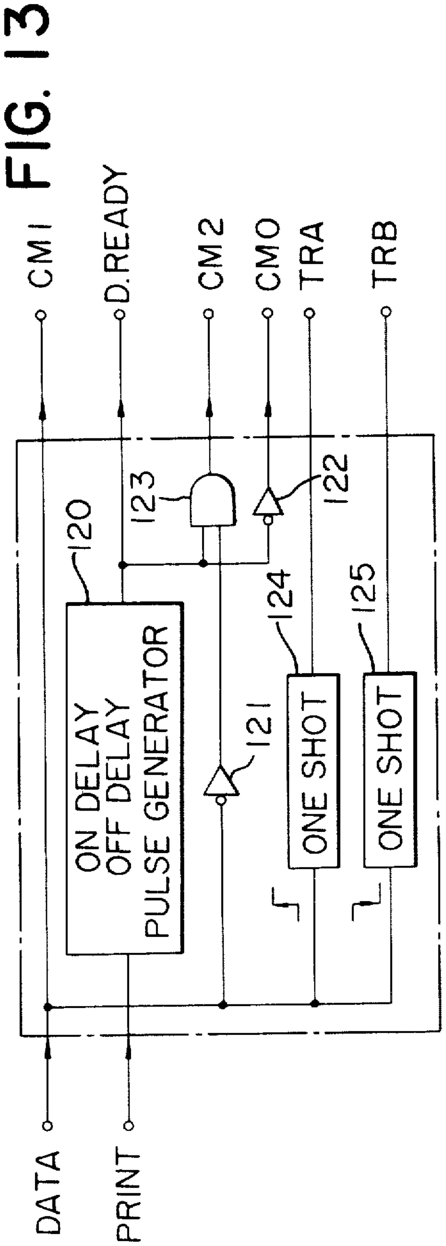
Figure 14:
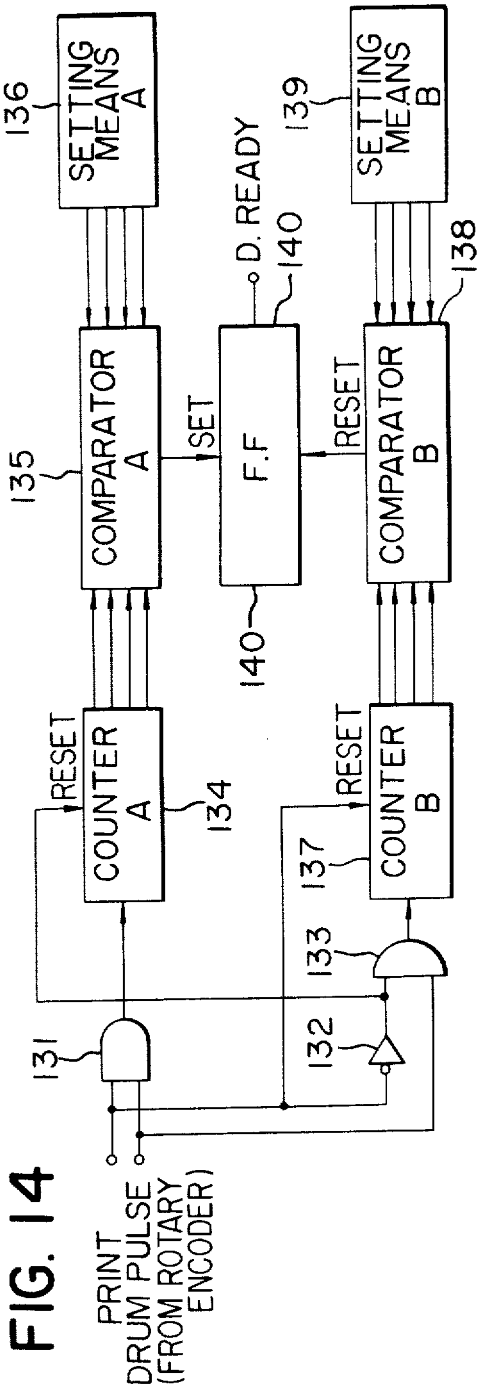

In FIG. 13, an inverter 121 is connected to an AND gate 123 to generate mode signal CM2 when there is no data and when data ready, and an inverter 122 is for generating signal CM0 when no data ready. Denoted by 124 and 125 are one-shot multivibrators for generating pulse signals TRA and TRB during the rising and falling of each data signal.

In FIG. 14, a setting means 136 is provided to set the time dA from print instruction to data ready. A counter 134 counts the pulse from the rotary encoder 35. A comparator 135 compares the count value with the set value and when they are coincident, sets a flip-flop 140 and puts out DATA ready signal. A setting means 139 is for setting the time dO measured from the disappearance of the print instruction to the disappearance of the DATA READY signal.

The operational sequence of the tractor for the feeding of paper (forward) will now be explained by reference to FIG. 11. When the drum starts rotating in response to the PRINT signal as already described, drum pulse are sent from the rotary encoder. After DATA READY is turned on, DATA signal is sent, whereupon TRA pulse is sent from the mode generator 110 to clear the counter 104 and open the gate 102, thereby generating the mode signal CM1. When the count by the counter 104 becomes coincident with the dB value of the setting means 107, dBC pulse is sent from the comparator 106. By the coincidence between dBC and CM1, JK flip-flop 113 is set. By this, a signal for driving the tractor is put out from the Q terminal to energize a tractor driving clutch. Designated by OSC is an oscillator for operating the JK flip-flop. When the counter 104 reaches a maximum count, a coincidence pulse is put out from 103 to close the gate 102, thereby stopping the advance of the counter 104. This state is held until DATA signal disappears and, when DATA signal disappears, TRB signal is put out to reset the counter 104 and open the gate 102. On the other hand, mode signal CM2 is put out from the mode generator 110. The counter 104 effects advance and when the count becomes coincident with the set value dH of the setting means 109, coincidence output dHC is put out. By this, coincidence is brought about between dHC and CM2, whereby JK flip-flop 113 is reset and the tractor (forward) drive signal disappears to stop the feeding. Likewise, thereafter, when DATA signal is again generated, tractor drive signal is generated with a delay corresponding to dB to start the feeding and the tractor drive signal disappears with a delay corresponding to dH. ON-OFF signals for the various driving portions (transfer charger, transfer roller, fixing roller) other than the tractor may be explained in the same manner as described above.

According to the present invention, as described above, the driving portions are individually controlled in a specific time relation with the start or the end of recording and this prevents unsatisfactory recording which would tend to occur at the start or the stop of the recording, and thereby prevents the useless blank portions from being increased.

It will be apparent that the present invention is applicable not only to the image transfer system but also to the so-called electrofax system wherein a latent image is formed on recording paper and then developed and fixed.

What we claim is:

1. A recording apparatus comprising:
- an image bearing member;
- means for forming continual images on said image bearing member;
- means for feeding a continuous transfer material to a transfer station;
- means for transferring the images formed on said image bearing member onto the continuous transfer material;
- means for fixing the transferred images on the transfer material; and
- means, responsive to the start and stop of operation of said image forming means, for controlling the actuation of said feeding means, transferring means, and fixing means at different delayed times from each other to transfer a series of images from said image bearing member onto desired portions of said continuous transfer material irrespective of image location on said image bearing member.

2. An apparatus according to claim 1, wherein the delay time for providing the delayed actuation of said transfer means is set by deducting the transient time between when a signal for actuating said transfer means is produced and when said transfer means reaches a stable operating condition.

3. An apparatus according to claim 1, wherein the delay time for providing the delayed actuation of said feeding means is set by deducting the transient time between when a signal for actuating said feeding means is produced and when said feeding means reaches a state whereat it feeds the transfer material at a stable speed.

4. An apparatus according to claim 1, wherein the delay time for producing the delayed actuation of said fixing means is set by deducting the transient time between when a signal for actuating said fixing means is produced and when said feeding means reaches a state whereat it feeds the transfer material at a stable speed.

5. A recording apparatus according to claim 1, wherein said transfer means includes a transfer charger and means for bringing said transfer material into contact with said image bearing member.

6. A recording apparatus according to claim 5 wherein said control means causes said contacting means to start operating earlier than said transfer charger.

7. A recording apparatus according to claim 1, wherein said fixing means includes a plurality of rollers with said transfer material interposed therebetween, and wherein said control means controls the pressure contact between said rollers.

8. A recording apparatus according to claim 7, wherein at least one of said rollers applies heat to the transfer material.

9. A recording apparatus according to claim 8, further comprising a heat roller provided with a heater, and wherein said heat roller applies heat to said at least one of said rollers.

10. A recording apparatus according to claim 1, wherein said image formation means includes means for forming electrostatic latent images on said image bearing member and means for developing said electrostatic latent images.

11. An apparatus according to claim 1, wherein said image forming means includes means for generating a modulation signal which corresponds to the image to be formed on said image bearing member.

12. An apparatus according to claim 11, wherein said image forming means comprises a beam oscillator for generating a beam for executing recording on said image bearing member and wherein said modulation signal controls the beam.

13. An apparatus according to claim 12, wherein said beam oscillator is a laser beam oscillator.

14. A recording apparatus according to claim 14, further comprising means for moving said transfer material in a retracting direction and wherein said control means operatively controls said retracting means before a subsequent image transfer takes place.

15. A recording apparatus according to claim 14, wherein said image bearing member is a rotatable member and said image forming means and said transfer means are provided adjacent to the surface of said rotatable member and wherein said apparatus further comprises means for generating a series of pulse signals during the rotation of said rotatable member, said delay times being set by the pulses from said pulse signal generating means.

16. An apparatus according to claim 14, wherein said continuous transfer material is fan-folded paper and said feeding means includes a tractor.

* * * * *